United States Patent [19]
Yang

[11] Patent Number: 5,254,910
[45] Date of Patent: Oct. 19, 1993

[54] COLOR-DIFFERENTIAL TYPE LIGHT DISPLAY DEVICE

[76] Inventor: Tai-Her Yang, 5-1 Taipin St., Si-Hu Town, Dzan-Hwa, Taiwan

[21] Appl. No.: 863,109

[22] Filed: Apr. 3, 1992

[51] Int. Cl.$^5$ ............................................. B60Q 1/26
[52] U.S. Cl. ...................................... 315/313; 315/77
[58] Field of Search ................ 315/77, 161, 313, 314, 315/315, 362; 307/10.8

[56] References Cited

U.S. PATENT DOCUMENTS 3,704,446 11/1972 Walter .............................. 315/77 X Primary Examiner—Steven Mottola
Attorney, Agent, or Firm—Leonard Bloom

[57] ABSTRACT

A brake light or other indicator light is provided with a transparent or nearly transparent housing and two lamps (LA,LB) within the housing, which lamps are differently colored and can be lit selectively by a switch (SW). Accordingly, the housing appears differently lit according to which lamp is lit and its apparent color and brightness is substantially unaffected by external illumination such as sunlight.

13 Claims, 1 Drawing Sheet

COLOR-DIFFERENTIAL TYPE LIGHT DISPLAY DEVICE

BACKGROUND OF THE INVENTION

Conventional colored indicator lamps are designed to give off a single color from a single source of illumination, and the effectiveness of the indicator is increased by an accompanying mono-color housing or colored cover. However, when ambient light reflects from the housing or colored cover it becomes difficult to tell whether or not the indicator is lit up or not. As a result, error very often occurs in reading the indicator.

For example, a conventional automobile brake lamp usually has a red housing and provides a red indicator when an internal bulb is switched on. However, the reflective red housing of the brake lamp frequently catches the sunlight and it becomes impossible for the tailing driver to identify whether the brake lamp is on or off.

It would be greatly advantageous to provide an indicator which eliminates such error.

SUMMARY OF THE INVENTION

Accordingly, it is an object of the present invention to provide a colored indicator device with at least two built-in sources of illumination for producing light in different colors, one color being a normal background color and the second color being an indicator color.

It is a further object of the invention to provide color-differential indicator lamp which emits a normal background color such as green in the absence of braking and an indicator color such as red at the time of braking. This way, trailing drivers may easily observe the change of color, i.e., green to red, so as to obtain a explicit brake warning even in the presence of strong ambient light.

The present invention accomplishes the above-described objects with at least two sets of built-in light sources for producing light in different colors and more specifically said two being alternatively illuminated to selectively provide normal background color and a second color (such as a warning indicator) display.

DETAILED DESCRIPTION OF THE INVENTION

Conventional colored indicator lamps are designed to give off only a single color, and this is typically accomplished using an illumination source enclosed in a mono-color housing or colored cover. However, when ambient light reflects from the colored cover it becomes difficult to tell whether the lamp is lit up or not. Consequently, errors occur very often in reading the indicator lamp. The present invention eliminates the problem by using at least two sets of built-in illumination sources for producing light in different colors. The two illumination sources are driven alternatively to provide normal background color and an indicator color.

Figure 1:
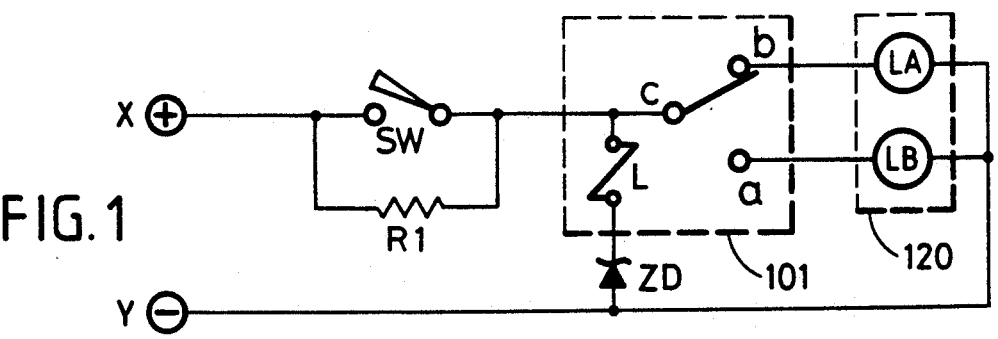
FIG. 1 is a schematic illustration of one embodiment of the invention wherein a single-pole double-throw auxiliary relay may be alternately switched between two built-in sources of illumination for producing light in different colors, one color being a normal background color and the second color being an indicator color according to the present invention.

The arrangement shown in FIG. 1 comprises two differently colored lamps LA and LB enclosed in a common transparent or translucent housing. The lamps LA and LB may be any suitable illuminating device such as, for instance, solid-state LED light sources, incandescent bulbs, or fluorescent bulbs of different colors. Both lamps LA and LB have one terminal connected to a common power supply terminal Y. The other terminals of lamps LA and LB are connected to contacts b and a, respectively, of a single-pole double-throw relay 101. The winding L of relay 101 is connected on one side to contact c of relay 101 and on the other side to the anode of a zener diode ZD. The cathode of diode ZD is in turn connected to the power supply terminal Y. A switch SW is connected between the other power supply terminal X and relay contact c, and a resistor R1 is connected in parallel across switch SW. As shown, contacts b and c are normally closed. While switch SW is open as shown, lamp LA is lit by current passing through resistor R1. The voltage drop across resistor R1 coupled with the voltage drop across zener diode ZD ensures that the winding W of relay 101 does not activate the relay. Accordingly, lamp LA remains lit.

On closing switch SW, resistor R1 is by-passed and the full supply voltage is applied across the series combination of zener diode ZD and the winding W of relay 101. The increased voltage across the relay winding W is sufficient to activate the relay 101 and close contacts c and a, with the result that lamp LA is turned off and lamp LB is turned on.

Figure 2:
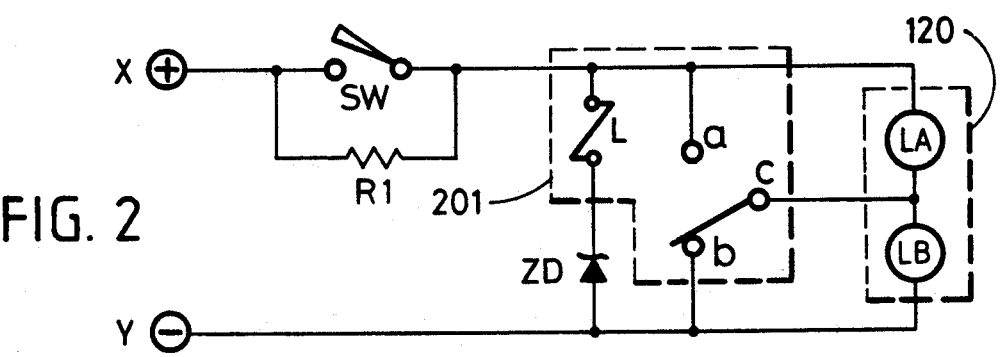
FIG. 2 is a second embodiment which employs an alternative wiring connection of the auxiliary relay of FIG. 1.

FIG. 2 is a second embodiment which is somewhat similar to that of FIG. 1 except that differently colored lamps LA and LB are connected in series. The normally open relay contact a is connected to one side of the series-connected lamps LA and LB, the normally closed relay contact b is connected to the other side, and the pole contact c is connected in between the two lamps LA and LB. In the configuration shown, only lamp LA is lit (by current through resistor R1), but on closing switch SW the voltage drop across the winding L of relay 201 becomes sufficient to activate the relay and close contacts a and c, whereby lamp LA turns off and lamp LB turns on.

Figure 3:
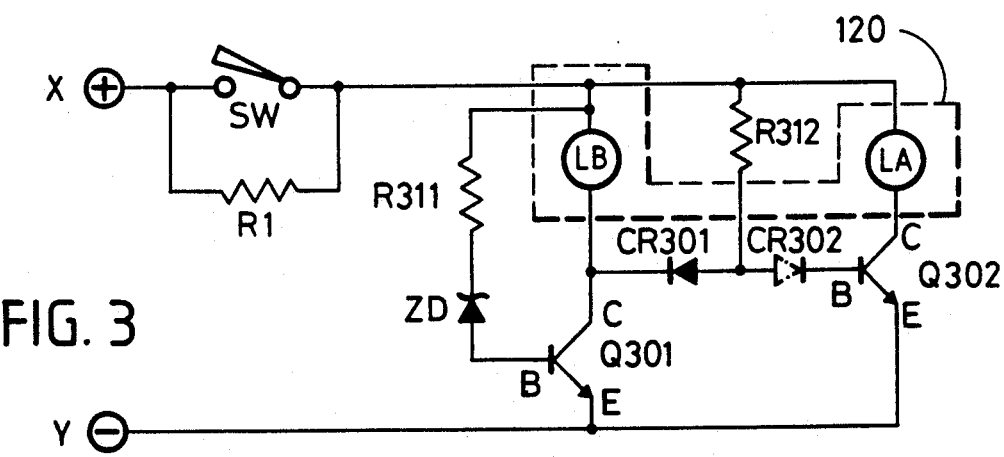
FIG. 3 is a third embodiment which operates similarly using solid state circuit elements.
Figure 4:
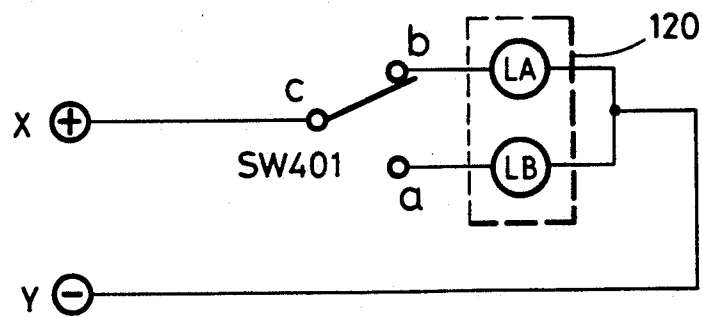
FIG. 4 is the embodiment showing a two-throw switch being applied to the color-differential type light display device of the present invention.

FIG. 3 illustrates a third embodiment of the invention where operation is similar to that shown in FIG. 2. However, the circuit is arranged in a slightly different configuration using solid state components. One side of lamps LA and LB is connected in series with the collector c and emitter e, respectively, of a corresponding switching transistor Q302 and Q301. As shown, the base B of transistor Q301 is connected through series-connected zener diode ZD and resistor R311 to the other side of lamp LB. The base B of transistor Q302 is connected through two optional bi-polar diodes CR301 and CR302 to the collector C of transistor Q301, and the interconnection between diodes CR301 and CR302 is further connected through a resistor R312 to the other side of lamps LA and LB. When switch SW is open (as shown) current flows through bypass resistor R1 and develops a biasing voltage at the base B of transistor Q302, via resistor R312 and optional diode CR302, and the biasing voltage is sufficient to switch on transistor Q302 and hence lamp LA. However in this condition, owing to the voltage drop across zener diode ZD, the bias at base B of transistor Q301 is insufficient to switch on this transistor and hence lamp LB remains off. On closing switch SW, the bias (via resistor R311 and zener diode ZD) at base B of transistor Q301 is sufficient to turn it on, and hence lamp LB lights up. Consequently, the bias potential at the base B of transistor Q302 falls, and this transistor and its associated lamp LA turn off.

In all of the above-described embodiments, when the contacts of switch SW are open, normal-status lamp LA illuminates to indicate a normal-status condition.

When the switch SW is closed, lamp LA extinguishes and warning lamp LB lights up.

To further accentuate the difference between the normal-status indication and warning or other indication, different power levels may be applied to the two lamps LA and LB. For instance, LA may emit a weaker normal-status light in contrast to brighter warning status light from LB. This can easily be accomplished by altering resistance R1 and appropriately matching the power supply voltage.

To conclude above description, said color-differential type light display device according to the present invention can provide a normal status indication light display on a color background by illumination of a normal-status lamp and second color display such as a warning display through another lamp of a different color. As a result, the display effect cannot be disturbed by external light.

I claim:

1. An illuminated display arrangement comprising a circuit having at least two differently colored light sources which are selectively energizable and are arranged to illuminate a housing such that said housing appears differently colored according to which light source is energized, said circuit further including a switch, an impedance in parallel with said switch, and a relay coupled to said switch and impedance, said relay having a normally closed pair of contacts connected to one light source and a normally open pair of contacts connected to the other light source, whereby said switch may be selectively opened to pass sufficient current through said impedance to light said one light source but insufficient current to activate said relay and light the other light source, and said switch may be selectively closed to bypass said impedance, thereby passing sufficient current to activate said relay, extinguish the one light source and light the other light source;

whereby an observed color of the housing is substantially unaffected by external illumination.

2. An illuminated display arrangement according to claim 1, wherein said relay has a normally closed pair of contacts connected in parallel to one light source and a normally open pair of contacts connected in parallel to the other light source.

3. An illuminated display arrangement according to claim 2, wherein the winding of said relay is connected in series with a zener diode which, when said switch is open, prevents the voltage across the relay from reaching a value sufficient to activate the relay.

4. An illuminated display arrangement comprising a circuit having at least two differently colored light sources which are selectively energizable and are arranged to illuminate a housing such that said housing appears differently colored according to which light source is energized, said light sources further comprising two lamps in series with the main electrodes of respective switching transistors in respective parallel branches of said circuit, said circuit further including a switch bypassed by a resistor which passes sufficient current to a control electrode of one switching transistor to switch on one of said lamps in series with one of said switching transistors but insufficient current to a control electrode of the other switching transistor to switch on the other of said lamps, whereby upon switching on said switch, said other switching transistor and said other lamp are switched on and said one switching transistor and said one lamp are switched off by virtue of a connection between the control electrode of said one switching transistor and the junction of said other lamp and other switching transistor.

5. An illuminated display arrangement according to claim 4, wherein said light sources are incandescent lamps.

6. An illuminated display arrangement according to claim 1, wherein said display arrangement serves as an indicator light of a vehicle.

7. An illuminated display arrangement according to claim 1, wherein said relay has a normally closed pair of contacts connected in series with one light source and a normally open pair of contacts connected in series with the other light source.

8. An illuminated display arrangement according to claim 1, wherein said two light sources are incandescent lamps.

9. An illuminated display arrangement according to claim 1, wherein said two light sources are LEDs.

10. An illuminated display arrangement according to claim 1, wherein said two light sources are fluorescent bulbs.

11. An illuminated display arrangement according to claim 4, wherein said two light sources are LEDs.

12. An illuminated display arrangement according to claim 4, wherein said two light sources are fluorescent bulbs.

13. An illuminated display arrangement according to claim 1, wherein said display arrangement serves as a vehicle brake light.

* * * * *